(12) United States Patent
Greenwood

(10) Patent No.: US 7,787,741 B2
(45) Date of Patent: Aug. 31, 2010

(54) PRIORITIZED CONTENT RECORDING AND STORAGE MANAGEMENT

(75) Inventor: Jon Michel Greenwood, Corona, CA (US)

(73) Assignee: Gateway, Inc., Irvine, CA (US)

( * ) Notice: Subject to any disclaimer, the term of this patent is extended or adjusted under 35 U.S.C. 154(b) by 1577 days.

(21) Appl. No.: 10/127,889

(22) Filed: Apr. 23, 2002

(65) Prior Publication Data

US 2003/0198458 A1    Oct. 23, 2003

(51) Int. Cl.
*H04N 5/91* (2006.01)
*H04N 7/00* (2006.01)

(52) U.S. Cl. ............................ 386/46; 386/95; 386/125

(58) Field of Classification Search ................ 386/46, 386/95, 125
See application file for complete search history.

(56) References Cited

U.S. PATENT DOCUMENTS

| 4,458,272 | A |  | 7/1984 | Heltmann | 360/8 |
|---|---|---|---|---|---|
| 4,730,222 | A |  | 3/1988 | Schauffele | 358/310 |
| 5,594,598 | A |  | 1/1997 | Shkakura | 360/49 |
| 5,819,004 | A |  | 10/1998 | Azadegan et al. | 386/112 |
| 5,982,373 | A |  | 11/1999 | Inman et al. | 345/419 |
| 6,023,553 | A |  | 2/2000 | Boyce et al. | 386/109 |
| 6,026,232 | A | * | 2/2000 | Yogeshwar et al. | 715/719 |
| 6,072,836 | A |  | 6/2000 | Hardiman | 375/240 |
| 6,192,190 | B1 |  | 2/2001 | Tojo et al. | 386/109 |
| 6,205,287 | B1 |  | 3/2001 | Takahashi et al. | 386/111 |
| 6,229,850 | B1 |  | 5/2001 | Linzer et al. | 375/240.11 |
| 6,232,974 | B1 |  | 5/2001 | Horvitz et al. | 345/419 |
| 6,671,454 | B1 | * | 12/2003 | Kaneko et al. | 386/83 |
| 6,947,598 | B2 | * | 9/2005 | Yogeshwar et al. | 382/232 |
| 7,221,857 | B2 | * | 5/2007 | Zimmermann | 386/124 |
| 2002/0012517 | A1 | * | 1/2002 | Ichioka et al. | 386/46 |
| 2002/0039483 | A1 | * | 4/2002 | Frost et al. | 386/109 |
| 2002/0174430 | A1 | * | 11/2002 | Ellis et al. | 725/46 |
| 2003/0066084 | A1 | * | 4/2003 | Kaars | 725/89 |
| 2003/0147631 | A1 | * | 8/2003 | Zimmermann | 386/95 |

* cited by examiner

*Primary Examiner*—Thai Tran
*Assistant Examiner*—Girumsew Wendmagegn
(74) *Attorney, Agent, or Firm*—WPAT, P.C.; Anthony King

(57) ABSTRACT

A storage management system selectively reduces a quality level of previously stored content. When storage in the system is becoming full, selected content is converted to a lower quality or lower storage size, based at least one of priority or age. Such conversion is performed in a computing background to minimize interference with programs being currently viewed. A user interface provides a list of programs that are candidates for conversion. The user selects programs to be converted or deleted to create additional storage for the new programs.

13 Claims, 2 Drawing Sheets

PRIORITIZED CONTENT RECORDING AND STORAGE MANAGEMENT

FIELD OF THE INVENTION

The present invention relates to storage of content for later viewing by a user, and in particular to prioritizing content recording and storage management.

BACKGROUND OF THE INVENTION

Recording systems for recording content, such as video programs received in the home are becoming more prevalent. Such systems allow a user in the home to select programs to record for later playback. Some of the systems provide for automated recording of a currently viewed program, allowing the user to stop viewing of the program, and resuming viewing of the program at a later time, from minutes to hours later. A user may delay viewing a program for several minutes, and then begin viewing the program. A sufficient amount of the program is recorded, allowing the user to skip portions of the program or advertising, yet continue viewing the program without delay.

The popularity of such systems is increasing. Storage space on these systems is an issue. Invariably, users find that they do not have sufficient storage space to record all the programming desired. Some systems offer methods to prioritize programming for storage. The system uses the priorities and optionally the length of time programming is stored to make decisions regarding deleting programs to free storage space for higher priority programming. Without deleting such programs, some of the functions for delayed viewing may not operate properly.

One problem with such storage management is that programming that may be important to someone in the user's household or business may be deleted. There is a need for a better way to manage storage of content to reduce or delay the deletion of desired programs.

SUMMARY OF THE INVENTION

A storage management system for programming content selectively reduces a quality level of previously stored content. When storage in the system is becoming full, selected content is converted to a lower quality based at least one of priority or age.

In one embodiment, three levels of content or video program quality levels are provided; low, medium and high. The low level requires the least amount of storage, while the high quality level provides the highest quality and also requires the most amount of storage, as it is compressed the least.

As storage is becoming full, a selected video program identified as the least likely to be used, is converted to one or more lower quality levels. Such conversion is performed in a computing background to minimize interference with programs being currently viewed. In further embodiments, conversion is performed when the system is not in use, or upon initiation of the user. In yet further embodiments, a user directly identifies programs to be converted, and the level of quality desired.

In still further embodiments, the system provides the user with a list of programs that are candidates for conversion. The user selects programs to be converted or deleted to create additional storage for the new programs.

DETAILED DESCRIPTION OF THE INVENTION

In the following description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

Figure 1:
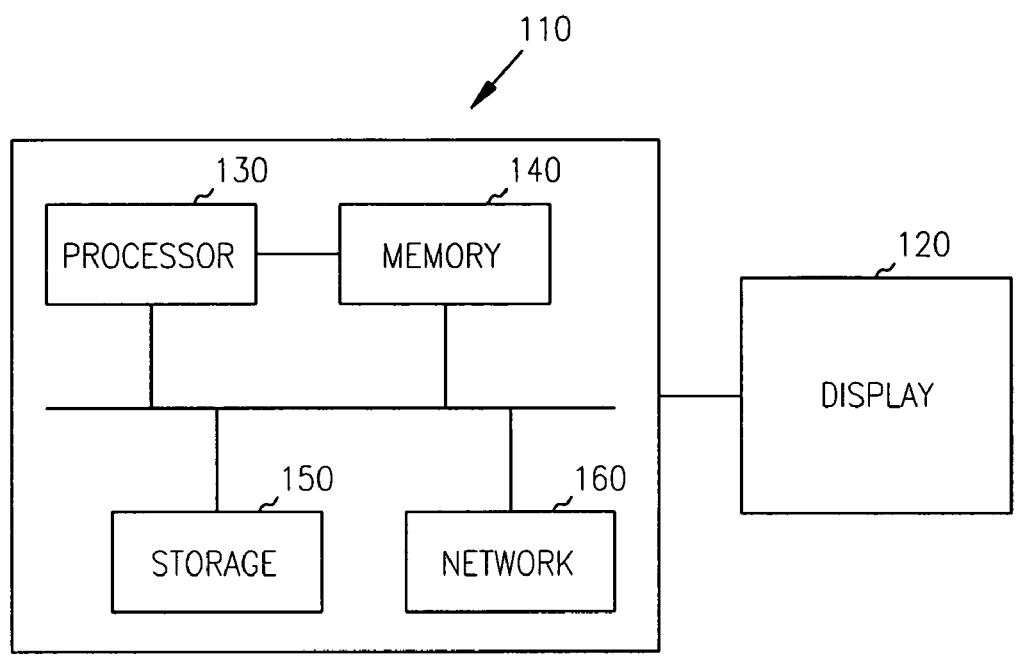
FIG. 1 is a block representation a computer system implementing the storage management method of the present invention.

An entertainment system is shown generally at 110, in FIG. 1, and includes a display device 120 for viewing video programs, and other content. The entertainment system 110 comprises a processor 130 such as a microprocessor or other electronic circuitry capable of being programmed or executing program instructions stored on a memory 140. A personal computer provides such a processor and memory in one embodiment. A set top box for television is used in a further embodiment.

Video programs are stored on a storage device 150. Storage device 150 comprises one or more devices utilizing tape, magnetic disk, optical disk, semiconductor storage, or other type of storage having a large enough capacity and high enough retrieval rate for providing video programs to be displayed. A network module 160 provides a connection to one or more sources of video programming or other content. Such sources include broadcast, satellite, cable, Ethernet or other high speed data services. In operation, video programming is stored in storage device 150 and played back via display 120 under control of the processor.

A bus system, comprising one or more busses couples the processor 130, memory 140, storage 150 and network 160 in a known manner. Other elements in common personal computers and set top boxes are not shown as they are well known in the art.

Figure 2:
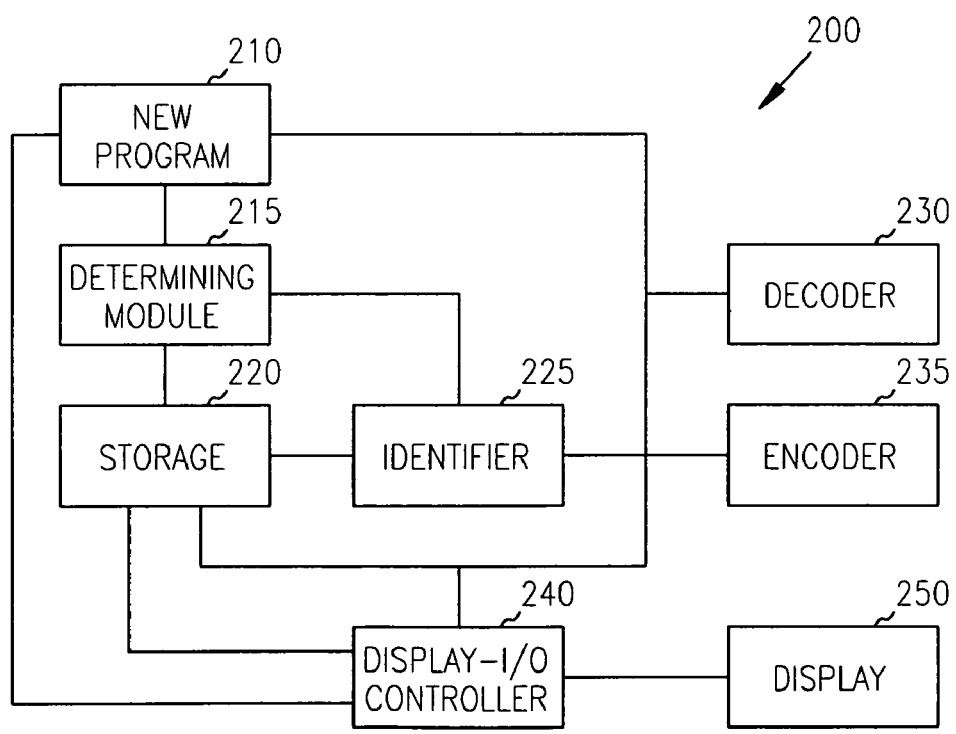
FIG. 2 is a block diagram of a system for managing storage in accordance with the method shown in FIG. 1.

A storage management system 200 in FIG. 2 selectively reduces a quality level of previously stored content to free storage space for new content. When storage in the system is becoming full, selected content is converted to a lower quality based at least one of priority or age.

At 210, new content in the form of a video program is received by the system. A determining module 215 monitors storage levels in a storage 220 to determine if there is sufficient storage space for the video program. In some embodiments, the video program indicates how much storage space it requires. In further embodiments, the determining module has a minimum space requirement set to handle a largest size video.

If the determining module determines that there is insufficient storage space available, an identifier module is used to determine which videos qualify for quality reduction. This is based on the length of time a video has been stored, frequency of viewing of the video, when it was last viewed, or based on a user defined priority for the video. Users may specify one of various rating systems to indicate the importance of keeping each video, such as a scale of 1, 2 or 3, with 1 being videos that are never converted to lower quality, and 3 being the videos that are first converted to lower quality as needed.

Once it is determined that additional storage space is required for a currently identified or, optionally, yet to be identified video, and a video for quality reduction is identified, a decoder 230 and encoder 235 are used to convert the quality of the video and restore it to storage. The higher quality copy of the video is then deleted from storage. The determining module ensures that sufficient storage is available to perform the conversion. Different known conversion routines may require varying amounts of available storage to perform a conversion. The decoder and encoder operate together in one embodiment, or the encoder directly performs the conversion without need for decoding in a further embodiment. The decoder is also used to decode programs in storage 220, or programs received, to permit a display-I/O controller 240 to display the video programs on display 250.

In a further embodiment, the display-I/O controller is used to provide a user interface to the storage management system. The display-I/O controller 240 passes user selections back to the identifier module 225 for identification of video programs to be converted as needed, or as specified by the user.

In one embodiment, three levels of content or video program quality levels are provided; low, medium and high. The low level requires the least amount of storage, while the high quality level provides the highest quality and also requires the most amount of storage, as it is compressed the least. One such compression scheme is well known and set forth in MPEG/2 standards for video compression. Further compression schemes will also operate with the present invention.

Figures 3, 4:
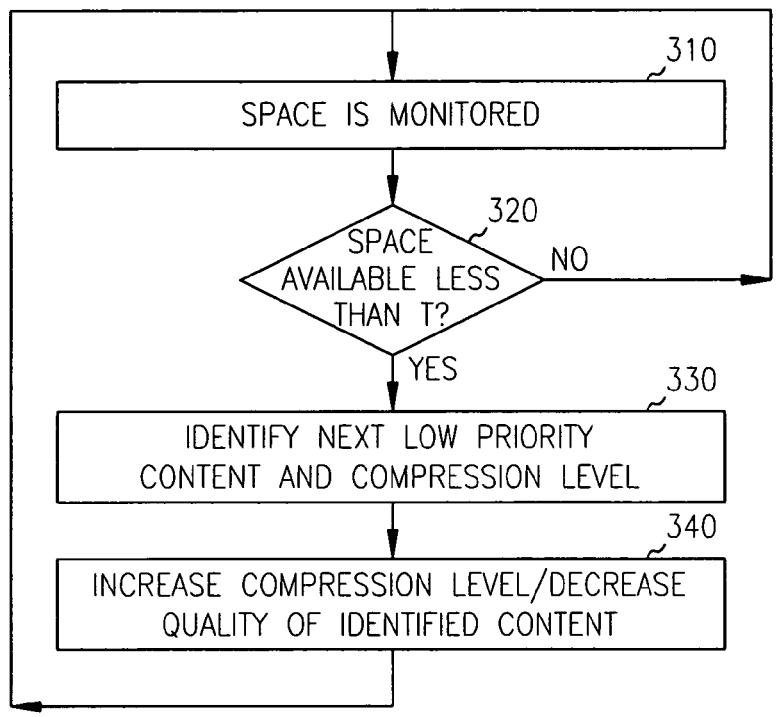
FIG. 3 is a flow chart illustrating a computer implemented method of converting content to obtain storage space for new content.
FIG. 4 is a text representation of a user interface for selecting programs for quality reduction.

A flowchart illustrating video program storage management is provided in FIG. 3. Available storage is monitored at 310. If the space available is less than a threshold, T, a next low priority video program is identified, along with a desired compression or quality level. T is derived from the length of time a video has been stored, frequency of viewing of the video, when it was last viewed, or based on a user defined priority for the video. It is also directly specified as a time or space indication corresponding approximately to a desired length of recording time a user desires. Since different video programs may compress at different compression ratios for a specified quality, there may be a desire to select T larger than thought to be required.

At 340, the next low priority video is converted to lower quality, normally corresponding to a higher compression rate and therefore less storage. Such conversion is performed in a computing background to minimize interference with programs being currently viewed. In further embodiments, conversion is performed when the system is not in use, or upon initiation of the user. In yet further embodiments, a user directly identifies programs to be converted, and the level of quality desired.

In still further embodiments, the system provides the user with a list of programs that are candidates for conversion. The user selects programs to be converted or deleted to create additional storage for the new programs.

After conversion of a video program, space is monitored again at 310, and a second check is performed at 320 to determine if enough space was freed up. If it was, processing returns to monitoring and checking at periodic intervals, or when a request to receive new content is received. If insufficient space was freed up, the next low priority video content is identified, and converted. This process is repeated until sufficient space is available.

The functions described herein are implemented in software in one embodiment, where the software comprises computer executable instructions stored on computer readable media such as memory or other type of storage devices. Further, such functions correspond to modules, which are software, hardware, firmware of any combination thereof. Multiple functions are performed in one or more modules as desired, and the embodiments described are merely examples.

FIG. 4 shows a representation of a user interface 410 that provide users with the ability to control the storage management system in a desired manner. Multiple columns of information are provided to the user, such as a content column 415, priority column 420 and current and new quality level columns, 425 and 430 respectively. These columns provide users with the ability to select a video by use of a check box, or other common user interface construct, and to specify both a priority and a quality level for conversion. For example, video 1 at 435 currently has a quality level of 1, the highest. A default new quality level is set at a medium level, 2. Video 2 at 440 is set to decrease in quality from 2 to 3, a low level. The user has modified the quality level of video 450 from 1 to 3, a two levels down in quality. The priority column is optional, and provides an indication of previously identified value of the video program by the user or another user in this manual mode of video selection, or the ability to set a new priority level.

Once a user selects videos to be converted, they have the option of beginning the conversion immediately at 455, or later at a time specified at 460. Further options provided to the user include asking the system to provide the list of videos in prioritized order 465, alphabetical order 470, or to just automatically apply the prioritization and conversion processes as needed.

An optional estimate of the amount of time freed for high quality video to be recorded is shown at 485. The user may select other quality levels. The time increases with lower quality levels. This estimate enables the user to make better decisions about how many video programs need conversion and the levels of conversion required to obtain sufficient space for a new video program or programs. Yet further embodiments provide the user the ability to select that a program be deleted.

What is claimed is:

1. A method of managing storage of a storage medium, the method comprising:
   determining when the storage medium is approaching insufficient capacity;
   identifying content stored on the storage medium for conversion to a format requiring less storage space;
   converting the identified content to the format requiring less storage space;
   wherein a determination of insufficient capacity is reached upon detecting content to be added to said storage device that requires more storage space than is available; and
   wherein said determining includes determining that sufficient storage is available to perform the conversion.

2. The method of claim 1 wherein further content is identified and converted until storage space exists for additional content.

3. The method of claim 1 wherein the content for conversion is identified based on priority.

4. The method of claim 1 wherein the content for conversion is identified by a user.

5. The method of claim 1 wherein the content for conversion is identified by a combination of age and user identified priority.

6. The method of claim 1 wherein high quality format content is converted to medium or low quality format content, and medium quality format content is converted to low quality format content.

7. The method of claim 6 wherein the high quality format requires the highest amount of storage space, and the low quality format requires the least amount of storage.

8. A method of managing storage of video programs on a storage medium for replay at a later time, the method comprising:

determining when the storage medium is approaching insufficient capacity;

identifying video programs stored on the storage medium for conversion to a format requiring less storage space based on overall user-defined priority level for conversion;

displaying a user interface to facilitate identification of the content for conversion;

converting the video programs to the format requiring less storage space until sufficient storage is available for an additional program; and displaying a different stored video program.

9. The method of claim 1 wherein the user interface is configured to accept user inputs to select the identified content for the conversion, to specify a quality level which determines the format requiring less storage space, and to specify a priority for said content in the storage device.

10. The method of claim 8 wherein the user interface is configured to accept user inputs to select the identified content for the conversion to specify a quality level which determines the format requiring less storage space and to specify a priority for said content in the storage device.

11. The method of claim 8 wherein a determination of insufficient capacity is reached upon detecting content to be added to said storage device that requires more storage space than is available.

12. The method of claim 1, wherein the user interface is configured to display modifiable information about user-defined priority level for conversion and quality of the content stored on the storage medium; and wherein the user interface is configured to display user-selectable inputs for the content for conversion.

13. The method of claim 1, wherein said conversion uses a known conversion routine to perform the conversion, the method further comprising:

determining that said sufficient storage is available to perform the conversion based on a given amount of storage required by the known conversion routine for the conversion.

* * * * *